United States Patent [19]

Fielding et al.

[11] 4,087,486

[45] May 2, 1978

[54] POLYPROPYLENE COMPOSITION CONTAINING EPR

[75] Inventors: Ivor R. Fielding, Naperville; Wassily Poppe, Lombard, both of Ill.

[73] Assignee: Standard Oil Company (Indiana), Chicago, Ill.

[21] Appl. No.: 577,685

[22] Filed: May 15, 1975

[51] Int. Cl.² .............................................. C08L 23/16
[52] U.S. Cl. .................................................. 260/897 A
[58] Field of Search ................................... 260/897 A

[56] References Cited

U.S. PATENT DOCUMENTS

| | | | |
|---|---|---|---|
| 3,036,987 | 5/1962 | Ranalli | 260/897 A |
| 3,121,070 | 2/1964 | Coover et al. | 260/897 B |
| 3,806,558 | 4/1974 | Fischer | 260/897 A |
| 3,940,379 | 2/1976 | Castagna et al. | 260/88.2 S |

*Primary Examiner*—Carman J. Seccuro
*Attorney, Agent, or Firm*—William H. Magidson; Arthur G. Gilkes; William T. McClain

[57] ABSTRACT

Polypropylene composition having improved knit-line properties comprising from 5 to 30 parts by weight of a saturated ethylene-propylene rubber, correspondingly 95 to 70 parts by weight crystalline homopolymeric polypropylene and from 0.01 to 0.2 parts by weight of an organic peroxide per each 100 parts by weight of the total concentration of saturated ethylene-propylene rubber and polypropylene.

5 Claims, No Drawings

POLYPROPYLENE COMPOSITION CONTAINING EPR

This invention relates to polypropylene compositions having improved knit-line strength. More particularly this invention relates to polypropylene compositions having improved knit-line strength comprising polypropylene, a saturated ethylene-propylene rubber and a peroxide.

Resinous polymers of propylene have been used extensively in the fabrication of molded parts. In many cases, the polypropylene is injection molded from more than one piece of equipment into the mold or the polypropylene must pass around an obstacle. In either of these cases, the juncture of the polypropylene fronts must form a relatively good knit-line. If the polypropylene composition does not have good knit-line properties, the molded object is subject to fracture under normal use conditions.

Although compositions consisting essentially of homopolymeric crystalline polypropylene have relatively good knit-line properties, polypropylene by itself is generally recognized as being relatively brittle and lacks impact resistance, i.e., molded parts break when they are dropped or when a heavy object is dropped on the molded parts. In substance homopolymeric crystalline polypropylene exhibits stiffness and is brittle. This brittleness is reflected in the polymer's low notched Izod impact value at room temperature. Attempts to improve impact resistance by compounding the crystalline propylene homopolymers with various ethylene-propylene rubbers (including diene modifications) has led to improved impact resistance. However, these compositions have relatively poor knit-line properties. Accordingly, when compositions comprising crystalline polypropylene and ethylene-propylene impact rubbers are used to fabricate molded products from two or more gates or when the polypropylene fronts must pass around an obstacle, the molded objects have poor knit-line and are subject to fracture when the molded objects are dropped or when heavy objects are dropped on the molded parts. While 95/5 propylene-ethylene copolymers, when compounded with impact rubbers, have relatively good knit-line properties, the higher cost of the copolymers makes it desirable to utilize homopolymeric polypropylene.

The general object of this invention is to provide polypropylene compositions having improved impact resistance and improved knit-line properties. Other objects appear hereinafter.

We have now found that the objects of this invention can be attained with polypropylene compositions comprising crystalline homopolymeric propylene, a saturated ethylene-propylene rubber and a peroxide. While we are aware that numerous patents disclose and suggest the addition of peroxides to polyolefin compositions, particularly polyethylene compositions, the prior art normally employs peroxides to cross-link the polyethylene and/or unsaturated rubber in the composition. See for example, U.S. Pat. Nos. 2,938,012; 3,265,800; and 3,597,499.

U.S. Pat. No. 2,938,012 is directed specifically to working a polyethylene and/or ethylene-propylene rubber plus peroxide with the object of cross-linking and reducing the flow rate of the composition. U.S. Pat. No. 3,265,800 describes a process for forming cross-linked molded parts, where a crystalline cross-linkable polyolefin plus peroxide is molded below the cross-linking temperature and then cross-linked. U.S. Pat. Nos. 3,597,499 discloses molding a composition comprising polypropylene and a elastomer containing at least 10% by weight 1,3-diene and peroxide to cross-link the diene rubber portion of the elastomer. While the predominate reaction between peroxides and polyethylene is cross-linking, the predominate reaction between peroxides and polypropylene is chain cleavage. See for example the Encyclopedia of Polymer Science, Vol. 4, pages 402–405 which indicates that the ratio of chain cleavage to cross-linking for polyethylene is 0.15 and for polypropylene 0.8 to 1.0.

Accordingly, in the instant invention, the primary function of the peroxide is not to cross-link the polypropylene or saturated ethylene-propylene but instead to degrade the polypropylene during extrusion. The reduced molecular weight of the polymeric composition of this invention is evident from the higher flow rate attainable with the polymeric components when the peroxide is present as opposed to when the peroxide is absent. This improved flow rate is at least partially responsible for the improved knit-line. For the purposes of this invention it is critical that crystalline polypropylene is the polyolefin being molded, that the ethylene-propylene rubber contains no diene or other types of carbon-to-carbon double bonds and that a peroxide is present. If any one of these three conditions are not fulfilled, the improved results of this invention cannot be attained.

The saturated ethylene-propylene rubbers useful in this invention contain from 75 to 30 percent by weight ethylene and correspondingly 25 to 70 percent by weight propylene. The saturated ethylene-propylene rubbers can be used in a concentration of from about 5 to 30 parts by weight with correspondingly 95 to 70 parts by weight of crystalline homopolymeric polypropylene.

The organic peroxides useful in this invention should have a half-life of about 1 to 30 seconds at the molding temperature (e.g. at a temperature in the range of about 400° to 525° F.) to provide free-radicals to degrade the polypropylene. If the peroxide has a half-life less than about 1 second, the peroxide is too unstable and can be destroyed without degrading the polypropylene to the desired extent. If the half-life is more than 30 seconds the peroxide is too stable and substantial peroxide can be present in the extrudate, i.e. there is insufficient degradation of the polypropylene. Suitable peroxides include cumene peroxide, ditertiary butyl peroxide, benzoyl peroxide, lauroyl peroxide, alpha, alpha'-bis (t-butylperoxy) diisopropylbenzene, etc. These peroxides can be used in a concentration of about 0.01 to 0.2 parts by weight per 100 parts by weight of the resinous components (polypropylene and saturated ethylene-propylene rubber). If more than .2 parts by weight peroxide are used the polypropylene can degrade excessively for many uses.

The compositions can be formed by blending polypropylene powder, peroxide and ethylene-propylene rubber, preferably in particles up to about ¼ inch cubes, and adding the blend to an extruder. If desired all the components of the composition can be added separately to the extruder hopper. Pigments, such as titanium dioxide, stabilizers, fire-retardants, etc. can also be added to the composition.

The compositions can be molded (extruded and/or injection molded) at about 400° to 525° F, preferably 400° to 450° F.

The following examples are merely illustrative.

EXAMPLE I

Ninety parts by weight stabilized crystalline homopolymeric polypropylene powder having a weight average molecular weight of about 450,000, 10 parts by weight SP-992EPR (an ethylene-propylene rubber containing 40% by weight propylene and 60% by weight ethylene) in pieces less than ¼ inch in any dimension and 0.1 part by weight Vul-Cup 40KE [60% clay and 40% by weight alpha, alpha'-bis (t-butylperoxy) diisopropylbenzene] were blended in a Waring Blender for 15 seconds. The blend was extruded on a one-inch pelletizing screw extruder having a ⅛ inch strand die maintained at 425° F into ⅛ inch long pellets. The extruded pellets were fed into a Frohring Mini-jector and injection molded at 425° F into a 3 × 0.5 × 0.125 inch bar. The mold was designed so that the polypropylene flow was split in half as it entered the mold, passed through two gates and then met in the middle of the bar. The molded bar was placed in an Izod test instrument and struck just above the knit-line. The technique was also repeated omitting the peroxide. The composition containing peroxide had a flow rate of over 14 grams/10 minutes and a knit-line strength of 0.82 'lbs. per " while the composition without peroxide had a flow rate of 4.1 grams/10 minutes and a knit-line strength of 0.50 'lbs. per ". The Gardner impact value for both compositions was about 43 or 44" lbs.

The above data indicates that the peroxide degrades the polypropylene, increases the flow rate markedly and improves the knit-line strength.

EXAMPLE II

Example I was repeated using an 80/20 polypropylene/SP-992EPR composition containing no peroxide and 0.06 parts by weight Vul-Cup 40KE per 100 parts by weight resin. The composition containing peroxide had a flow rate of 7.7 grams/10 minutes, a knit-line strength of 0.47 'lbs. per " and a Gardner impact of 140–150 "lbs. while the composition without peroxide had a flow rate of 2.1 grams/10 minutes, a knit-line strength of 0.38 'lbs. per " and a Gardner impact over 160 "lbs.

We claim:

1. A polypropylene composition having improved knit-line properties comprising from 5 to 30 parts by weight of a saturated ethylene-propylene rubber, correspondingly 95 to 70 parts by weight crystalline homopolymeric polypropylene and from 0.01 to 0.2 parts by weight of an organic peroxide per each 100 parts by weight of the total concentration of saturated ethylene-propylene rubber and polypropylene.

2. The composition of claim 1, wherein said ethylene-propylene rubber comprises from 75 to 30 percent by weight ethylene and correspondingly from 25 to 70 percent by weight propylene.

3. The composition of claim 1, wherein said peroxide has a half-life of about 1 to 30 seconds at a temperature in the range of about 400° to 525° F.

4. The composition of claim 3, wherein said peroxide comprises alpha, alpha'-bis (t-butylperoxy) diisopropylbenzene.

5. The process of forming molded parts having improved knit-line properties where two fronts meet which comprises molding the composition of claim 1 at about 400° to 525° F.

* * * * *